April 22, 1952 P. KOLLSMAN 2,593,770
DEVICE FOR CARBONATING AND DISPENSING BEVERAGES
Filed July 10, 1946 4 Sheets-Sheet 2

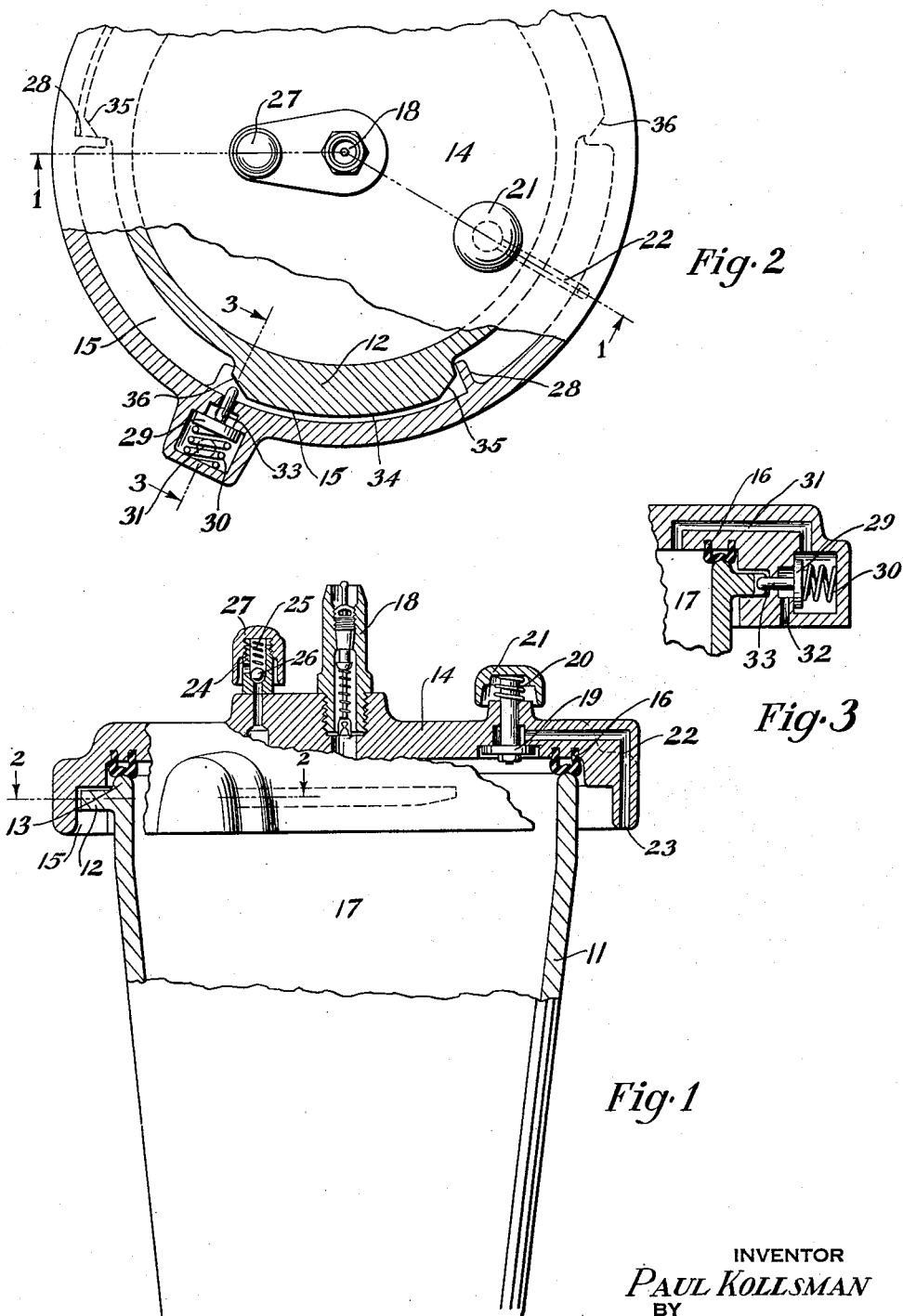

INVENTOR
PAUL KOLLSMAN
BY
Albert M. Austin
his ATTORNEY

April 22, 1952        P. KOLLSMAN        2,593,770

DEVICE FOR CARBONATING AND DISPENSING BEVERAGES

Filed July 10, 1946        4 Sheets-Sheet 3

INVENTOR
PAUL KOLLSMAN
BY
Albert M. Austin
his ATTORNEY

April 22, 1952     P. KOLLSMAN     2,593,770
DEVICE FOR CARBONATING AND DISPENSING BEVERAGES
Filed July 10, 1946     4 Sheets-Sheet 4

INVENTOR
PAUL KOLLSMAN
BY
Albert M. Austin
his ATTORNEY

Patented Apr. 22, 1952

2,593,770

UNITED STATES PATENT OFFICE 2,593,770

DEVICE FOR CARBONATING AND DISPENSING BEVERAGES

Paul Kollsman, New York, N. Y.

Application July 10, 1946, Serial No. 682,662

9 Claims. (Cl. 261—64)

This invention provides a simple, inexpensive and efficient apparatus for mixing, carbonating, and dispensing beverages.

At present it is common practice to carbonate beverages at the plant of the producer and to ship the carbonated beverage in appropriate pressure resistant bottles, tanks or other containers to the place of consumption, for example, a soda fountain. This practice entails certain disadvantages. The shipping and storing of bottles or other containers of carbonated beverage involves handling of much dead weight and requires a considerable amount of space resulting in substantial expense. The described practice has the further disadvantage that the demand both as to quantity and kind of beverage must be anticipated and that unexpected demands cannot be supplied.

Other common practice is to mix a flavoring liquid at the soda fountain with water carbonated on the premises. This practice calls for an installation of substantial size including compressors, tanks and piping which constitute a considerable investment. However, the main disadvantage of the last mentioned practice is that the dispensing of carbonated water into a cup, the addition of a flavoring substance and the subsequent stirring of the beverage in order to mix it results in a loss of a very substantial portion of the carbon dioxide. A beverage produced in this manner has therefore relatively little effervescence since most of the carbon dioxide is driven out before the beverage is actually consumed. As a further disadvantage may be mentioned that beverages produced in this manner must necessarily have a water base since carbon dioxide is introduced into the beverage only through the medium of water.

The invention provides a simple, efficient yet inexpensive apparatus which permits carbonating and dispensing of any type of beverage immediately before the beverage is consumed. The invention lends itself to the carbonating of a beverage while it is being mixed, is not dependent on the supply of carbonated water, permits mixing and carbonating in one operation, and produces a beverage which at the time of pouring or consuming contains the greatest amount of carbon dioxide which it can physically hold. Carbon dioxide may be supplied from conventional and standardized steel cylinders and the entire mixing, carbonating and dispensing apparatus, apart from the steel cylinder hardly exceeds in size an ordinary drinking or mixing cup or the conventional small motor driven stirrer for mixing cups in common use throughout the country.

The various objects, features and advantages of the invention will appear more fully from the detailed description which follows accompanied by drawings showing for the purpose of illustration a preferred embodiment of the invention. The invention also consists in certain, new and original features of construction and combination of parts hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description, taken in connection with the accompanying drawings forming a part of it in which:

Figure 1 is a side view, partly in section, of a mixing, carbonating and dispensing vessel embodying the invention, the section being taken on line 1—1 of Fig. 2;

Figure 2 is a plan view, partly in section, of the vessel shown in Figure 1, a section being taken on line 2—2 of Fig. 1;

Figure 3 is a sectional simplified side view of a valve of the vessel shown in Fig. 1, the section being taken on line 3—3 of Fig. 2;

Figures 4, 5:
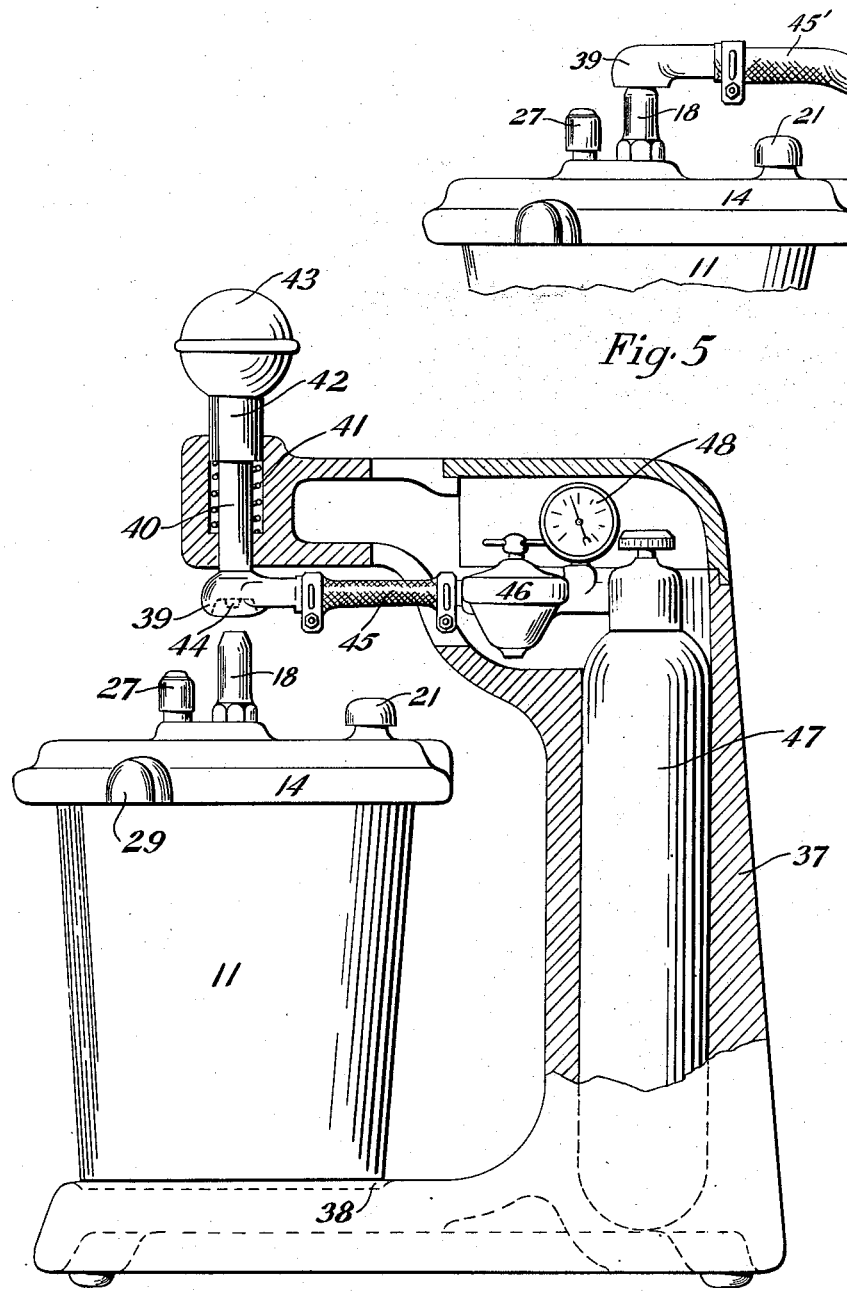
Figure 4 is an elevational side view, partly in section, of an apparatus in which the vessel of Figure 1 forms a part.
Figure 5 illustrates a different manner of use of the vessel shown in Figure 1.

In the following description and in the claims various details will be identified by specific names for convenience. The names however are intended to be as generic in their application as the art will permit. Like reference characters refer to like parts in the several figures of the drawings.

In the drawings accompanying, and forming part of, this specification certain specific disclosure of the invention is made for the purpose of explanation of broader aspects of the invention, but it is understood that the details may be modified in various respects without departure from the principles of the invention, and that the invention may be applied to other structures than the ones specifically shown.

Referring to the drawings, the apparatus shown in Figure 1 comprises a strong walled pressure resistant cup 11 having lugs 12 near its rim 13 for attaching to the cup a cover 14 having corresponding inwardly extending lugs 15 for engaging the lugs 12 of the cup in the manner of a bayonet connection. The cover 14 has a gasket 16 which is pressed against the rim 13 when the lugs 12 and 15 are engaged to provide a pressure type seal between the cup 11 and the cover 14, whereby the interior 17 of the cup becomes a sealed pressure chamber.

An inlet check valve 18 similar to the valves used on the inner tubes of automobile tires is mounted in the cover 14 and permits introduction of a gas under pressure into the pressure chamber 17.

Gas may be discharged to the atmosphere from the pressure chamber by a relief or vent valve 19 normally held closed by a spring 20 and manually operable by a knob 21. The vent valve 19 controls a vent passage 22 leading from the interior 17 to the atmosphere at 23.

The building up of excessive pressure in the chamber 17 is prevented by an automatic relief valve 24 adapted to open automatically when the pressure inside the chamber 17 exceeds a predetermined value. The relief valve 24 has a spring 25 bearing against a valve member 26, the tension of the spring being adjustable by a screw cap 27.

Means are provided for preventing the building up of pressure inside the chamber 17 unless the cover 14 is firmly locked in the cup 11. Referring particularly to Figure 2 the cover 14 is firmly locked to the cup 11 when the lugs 12 of the cup fully engage the lugs 15 of the cover, in which position the ends of the lugs 12 bear against stops 28 at the ends of the lugs 15 on the cover.

The safety means for preventing pressure from building up in the chamber 17, unless the chamber is securely locked, comprises an automatic vent valve 29 normally held closed by a spring 30. The vent valve controls a passage 31, 32, leading from the chamber 17 to the atmosphere. The valve 29 is actuable by a pin 33 adapted to engage the periphery 34 of the lugs 12 on the cup. The lugs 12 have two sloping portions 35 and 36 permitting the pin 33 to ride onto the portion of largest diameter of the periphery 34 when the cover is being attached to the cup and to become disengaged therefrom at the end position in which the lugs 12 and 15 are completely engaged.

When the cover is attached to the cup the sloping portion 35 first engages the pin 33 and causes the pin to move onto the portion of largest diameter of the lug periphery 34. In this position the valve 29 is open and if accidentally carbon dioxide under pressure were supplied through the admission valve 18 the pressure would be relieved immediately through the vent valve 29, so that no pressure could be built up in the cup. When the lugs 12 and 15 are fully engaged the pin 33 moves down the sloping portion 36 causing the valve 29 to close under the force of the spring 30. In this position the chamber 17 is firmly sealed and there is no danger of disengagement of the cover 14 and cup 11.

If, on the other hand, it were attempted to remove the cover 14 from the cup 11 without first relieving the pressure from the chamber through the manually operable vent valve 21 the disengagement of the cover and cup would automatically cause venting of the chamber 17 through the vent valve 29 which automatically opens during the disengagement of the cover 14 from the cup 11. The device is thus rendered fool-proof and accidents by opening of the chamber 17 under pressure are prevented.

The cup 11 and attached cover 14 are conveniently used in connection with a semi-automatic device for supplying gas under pressure into the pressure chamber 17. Figure 4 illustrates a preferred form of device for this purpose. A base 37 has an appropriately shaped seat 38 adapted to receive the bottom of the cup 11 to adjust the cup to a predetermined position with respect to the base. A valve coupling 39 is movably mounted on the base in a position to engage without further adjustment the inlet valve 18. In the illustrated form of apparatus the valve coupling 39 is attached to a stem 40 vertically slidable in the base and acted upon by a spring 41 bearing against an enlarged portion 42 to which a manually operable knob 43 is attached. The spring 41 normally holds the coupling 39 in a position out of engagement with the inlet valve 18 so that the cup and cover unit 11, 14 may be easily placed on and removed from the base 37. The valve coupling 39 may be brought into pressure tight engagement with the valve 18 by depression of the knob 43 against the action of the spring 41. The valve coupling 39 is equipped with an automatic shut-off valve operable by a pin 44 which closes the coupling in the position in which it is disengaged from the valve 18 and permits the coupling to discharge gas under pressure when it is pressed into engagement with the inlet valve 18. Outlet valves for valve couplings are commonly known in installations for inflating inner tubes of tires and for this reason need not be illustrated in the present drawings in detail.

Carbon dioxide under pressure is supplied to the valve coupling 39 through a hose 45 extending from an automatic regulator 46 for reducing the pressure. The regulator 46 may be of conventional construction and is supplied with carbon dioxide under pressure from a suitable source, for example a steel flask or cylinder 47 which may be inserted into the base as shown or may be located at a remote point. A pressure gauge 48 may be employed for indicating the pressure in the flask 47 which is a measure of the amount of carbon dioxide left in the flask.

The apparatus so far described may be used and operated as follows:

The ingredients of a beverage for example, a flavoring syrup and a liquid, and possibly other ingredients, are poured into the cup 11 filling the cup partially, preferably not more than two thirds or three quarters of its volume. The cover 14 is firmly attached to the cup forming a pressure tight chamber with the cup. The assembly is then placed on the seat 38 of the base 37 and the knob 43 is depressed, whereby carbon dioxide under pressure is admitted into the pressure chamber. The pressure of the carbon dioxide admitted into the chamber is determined by the pressure for which the regulator 46 is adjusted.

The cup and cover 11, 14 with the charge of carbon dioxide gas are then removed from the base and given a few shakes whereby the ingredients are not only mixed but also brought into intimate contact with the carbon dioxide in the chamber. As a result the beverage becomes carbonated by absorbing a substantial portion of the carbon dioxide gas in the pressure chamber 17. The liquid is then permitted to assume a quiescent state and the remaining pressure in the chamber 17 is vented by pushing down on the knob 21 of the vent valves 19. The cover 14 is then removed from the cup and the beverage is ready for consumption.

The beverage contains a very strong charge of carbon dioxide due to the fact that it was carbonated under pressure and the pressure not relieved until the beverage had assumed a quiescent state. No stirring or disturbing of the carbonated beverage occurs after the cover 14 is removed whereby the beverage is dispensed with carbon dioxide content far in excess of that of any beverage produced by mixing carbonated water with flavoring liquid.

It is immaterial what constituents are used for making the beverage. It is therefore not necessary that water be used as the main ingredient, as is necessary when carbon dioxide is added to the beverage through the medium of water, but milk or other liquids may be employed for making the beverage.

It will also be noted that the entire volume of the liquid is carbonated whereas according to conventional practice only a portion of the volume of the beverage is carbonated, namely the water where carbonated water is mixed with a flavoring liquid which itself is not carbonated.

It is of course not necessary to use the cup and cover unit 11, 14 in connection with a base similar to that illustrated in Figure 4. The sealed cup and cover 11, 14 may also be placed on a table or counter and carbon dioxide under pressure be supplied from a pressure hose 45' leading from a source of carbon dioxide under pressure. This modification is illustrated in Figure 5. Carbon dioxide is admitted into the pressure chamber by pressing the valve coupling 39 on the inlet valve 18 in a similar manner as a valve coupling is pressed against the stem of an inner tube valve. In this case, of course, the valve coupling 39 must be placed on the inlet valve 18 by hand whereas in the installation of Figure 4 the alignment between valve and coupling is obtained automatically by placing the cup 11 on the base 37.

After charging the pressure chamber of the cup 11 the hose 45' and the hose connection are removed, the contents of the cup 11 are shaken, the cover 14 is removed, and the beverage is dispensed in the same manner as previously described in connection with Figure 4.

Figures 6, 7:
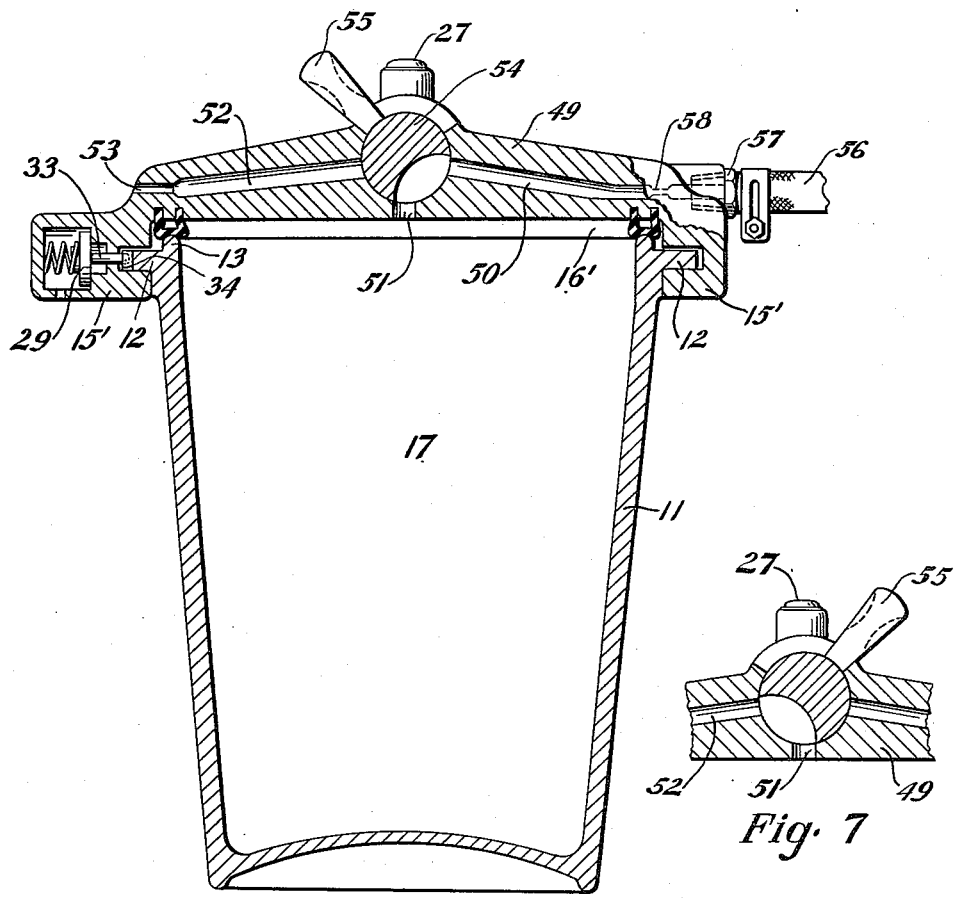
Figure 6 is an elevational side view, partly in section, of a modified form of mixing, carbonating, and dispensing vessel.
Figure 7 is a detailed view showing a valve of the device of Figure 6 in a different position.

A modified form of apparatus is shown in Figures 6 and 7. The cup 11 is of the same construction as the cup previously described and illustrated in Figures 1 to 5. The cup 11 has lugs 12 near its rim 13. The lugs 12 of the cup interlock with lugs 15' of a cover 49 equipped with a gasket 16' bearing against the rim 13 of the cup. The cover 49 has a gas supply passage 50 therethrough leading to an inlet passage 51. A discharge passage 52 leads to an exhaust port 53. Both the supply passage 50 and the discharge passage 52 are controlled by a common valve 54 operable by a lever 55. The valve 54 has two positions, one in which the supply passage 50 is brought into communication with the inlet passage 51, as shown in Figure 6, and a second position in which the inlet passage 51 is brought into communication with the discharge passage 52, as shown in Figure 7. Carbon dioxide under pressure is supplied to the supply passage 50 through a pressure hose 56 attached to the cover 49 at 57. Preferably the supply passage 50 contains a restricted portion 58 to limit the rate at which gas is admitted into the interior of the cup.

The cover 49 is further equipped with an automatic relief valve whose cap is visible at 27 and an automatic vent valve 29 operable by a pin 33 from the periphery 34 of the lugs 12, as previously described in Figures 2 and 3.

The use and operation of the device shown in Figures 6 and 7 is as follows:

After the cup 11 has been filled to a predetermined level, preferably two-thirds or three-quarters of its volume, the cover 49 is attached to the cup 11 and the valve 54 is moved into the position shown in Figure 6 in which carbon dioxide under pressure is admitted in the chamber 17. The cup and cover unit attached to the hose 56 are then shaken, the hose 56 being of sufficient length to provide sufficient freedom of movement. While the contents are being shaken and carbon dioxide is being absorbed by the contents, additional carbon dioxide is being supplied to the hose 56 so that the liquid in the cup becomes fully saturated with carbon dioxide. The valve 54 is then moved into the discharge position shown in Figure 7 after the beverage has assumed a quiescent state. Thereafter the cover may be removed from the cup and the beverage be dispensed in the same manner as previously described.

Figure 8:
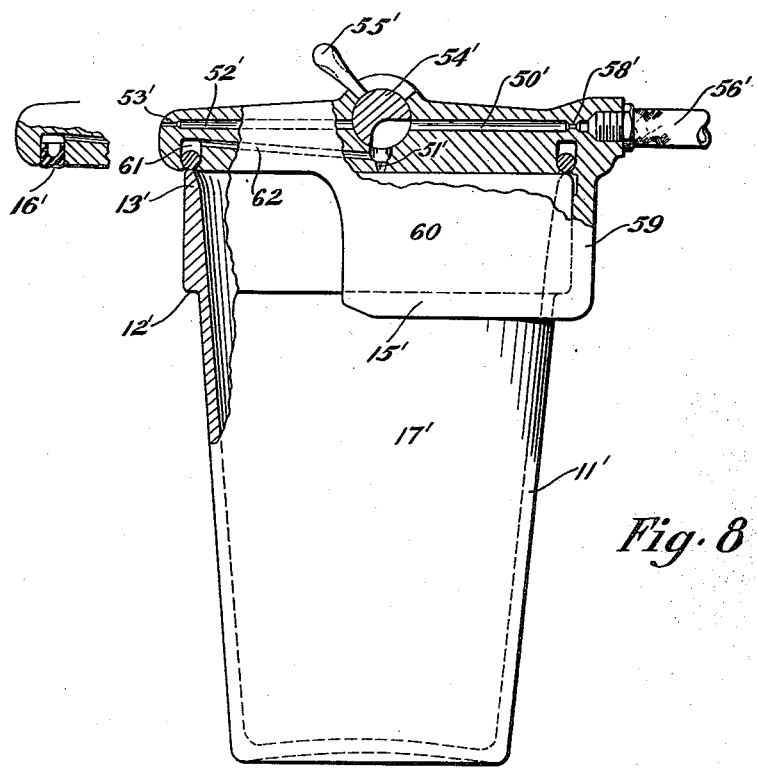
Figure 8 is a side view, partly in section of a modified form and vessel comprising a cup and a slip-on cover.
Figure 9:
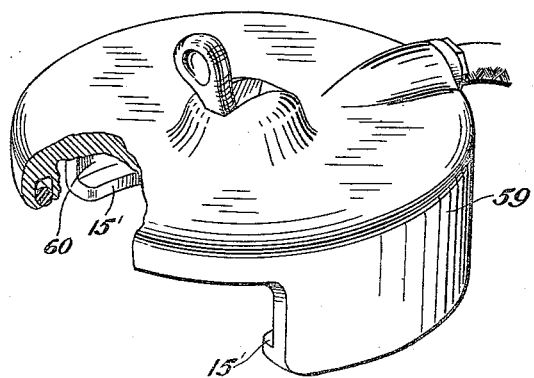
Figure 9 is a perspective, partly fractional, view of the cover of the vessel shown in Figure 8.

A modified carbonating vessel comprising a cup 11', and a cover 59 therefore is shown in Figures 8 and 9. The cup 11' has a relatively thin rim 13' which makes the cup particularly suited for use as a drinking cup. A flange 12' on the cup is engaged by a shoulder 15' on the end of a depending side wall 60 of the cover 59. The side wall 60 extends through an arc of approximately 180° and permits attachment of the cover to the cup 11' by slipping it on the cup from the side.

A gasket 16' rests in a circumferential groove 61 on the underside of the cover and may be acted upon by pressure in the interior 17' of the cup through a passage 62 leading to the inlet passage 51' through which carbon dioxide is supplied to the interior 17' of the cup.

Carbon dioxide under pressure is supplied to the cover through a pressure hose 56' leading to a supply passage 50' including a constriction 58'. A valve 54' operable by a lever 55' permits the interior 17' of the cup to be brought into communication with either the supply passage 55 or a vent passage 52' leading to the atmosphere at 53'.

When carbon dioxide is admitted into the cup, the pressure acts upon the gasket 16', expands it, and forces it against the rims 13' of the cup 11' thus establishing a pressure tight seal between the cup 11' and the cover 59. The liquid may then be carbonated while under pressure, in the same manner as in the previously described embodiments. When the valve 54' is moved into the other position the supply of carbon dioxide is shut off, the interior 17' of the cup is vented and the pressure on the gasket 16' is relieved whereafter the cover 59 may easily be removed from the cup and the beverage be dispensed.

The invention thus provides an extremely simple, inexpensive, yet very efficient, apparatus for carbonating liquids of any kinds. The apparatus effectively overcomes the various disadvantages of conventional installations and permits preparation, immediately prior to consumption, of any kind and any flavor of carbonated beverage, thus doing away with the necessity of maintaining large stocks of different carbonated beverages. The carbon dioxide content of the beverage produced by the present apparatus far exceeds anything previously obtainable by conventional equipment and even exceeds the carbon dioxide content of bottled beverages since the pouring of carbonated beverage from a bottle causes a certain amount of turbulence in the liquid and a corresponding loss of carbon dioxide which the present invention avoids.

Obviously the present invention is not restricted to the particular form of apparatus herein shown and described. Evidently cups of a variety of sizes may be used in connection with the same cover. Thus a cup of proper size may be selected for carbonating a predetermined volume of beverage, the size of the cup being such that the space above the liquid bears a predetermined relation to the volume of the beverage to be carbonated. This arrangement prevents waste of carbon dioxide gas, particularly when small volumes of liquid are to be carbonated. Whereas in certain conventional devices fixed quantities of gas are released from capsules or cartridges into a carbonating chamber, regardless of the actual volume of liquid therein. The invention offers increased economy by providing for a variety of cup sizes, all usable with the same cover, which provide for admission into the carbonating chamber of exactly the proper amount of carbon dioxide gas for the respective liquid volume.

A further advantage of the invention rests in the fact that the carbonated beverage is consumed from the cup or poured out at atmospheric pressure thus avoiding turbulence of the liquid which leads to loss of a portion of the carbon dioxide charge. This makes devices embodying the invention particularly suited for use by the average person who does not realize that stirring or disturbance of a carbonated beverage leads to a loss of carbon dioxide. The present invention therefore gives optimum results even in the hands of an untrained person.

The invention permits carbonation of beverages containing solid matter, such as ice cubes or fruit pulp. Such beverages cannot be carbonated in devices where the beverage is forced, or discharged, through narrow passages which become clogged by solid matter.

The shape of the cups may be altered in many respects. For example the lugs for attachment of the cover may be placed lower to provide a smooth unbroken run in case the beverage is to be consumed from the cup. Other forms of connection between cup and cover may also be employed. Thus various changes, additions, omissions, substitutions and modifications may be made without departure from the spirit and the essence of the invention.

What is claimed is:

1. A device for carbonating and dispensing beverages comprising a source of carbon dioxide under pressure; a pressure resistant cup having a rim and an outwardly extending protrusion adjacent to, and below, said rim; a cover having an inwardly extending protrusion for engaging, and locking with, the outwardly extending protrusion of said cup and including sealing means for sealing the cover to the cup to form a sealed pressure chamber when said protrusions are in engaged position, the cup and cover constituting a unit adapted to be shaken by hand; means including a flexible hose for introducing gas under pressure into the pressure chamber from said source, said unit being free from any rigid connection with said source for freedom of movement in all directions relatively to said source while under pressure; and a relief valve in said cover for relieving pressure from said chamber.

2. A device for carbonating and dispensing beverages comprising, a source of carbon dioxide under pressure; a pressure resistant cup having a rim and an outwardly extending protrusion adjacent to, and below, said rim; a cover having an inwardly extending protrusion for engaging, and locking with, the outwardly extending protrusion of said cup and including sealing means for sealing the cover to the cup to form a sealed pressure chamber therewith when the protrusions of the cup and of the cover are in engaged position, the cup and cover constituting a unit adapted to be shaken by hand; means associated with said cover for introducing gas under pressure into said chamber from said source, said unit being free from any rigid connection with said source for freedom of movement in all directions relatively to said source while under pressure; means in said cover for relieving pressure from said chamber; and means associated with said cover and cup and actuable by the relative position of the cover with respect to the cup for establishing communication of the chamber with the atmosphere except when the cover is in firmly attached position on the cup.

3. A device for carbonating and dispensing beverages comprising a source of carbon dioxide under pressure; a pressure resistant cup; a cover for said cup, said cup and cover having interlocking lugs for attaching said cover to said cup and a gasket for producing a pressure seal between cover and cup to provide a sealed pressure chamber, the cup and cover constituting a unit adapted to be shaken by hand; means associated with the cover for introducing gas under pressure into said chamber from said source, said unit being free from any rigid connection with said source for freedom of movement in all directions relatively to said source while under pressure; means in said cover for relieving pressure from said chamber; and means operable by the relative position of said cup and cover for establishing communication of the chamber with the atmosphere except when the lugs are in interlocked position.

4. A device for carbonating and dispensing beverages comprising, a source of carbon dioxide under pressure; a pressure resistant cup having a rim and an outwardly extending protrusion adjacent to, and below, said rim; a cover having an inwardly extending protrusion for engaging, and locking with, the outwardly engaging protrusion on said cup and including sealing means for sealing the cover to the cup to form a sealed pressure chamber, the cup and cover constituting a unit adapted to be shaken by hand; an inlet check valve on said cover for introducing gas under pressure into said chamber and retaining it therein, said valve having means for releasable attachment to a pressure hose coupling supplying carbon dioxide from said source; and a manually operable relief valve on said cover for relieving pressure from said chamber, said unit being free from any rigid connection with said source for freedom of movement in all directions relatively to said source while under pressure.

5. A device for carbonating and dispensing beverages comprising a source of carbon dioxide under pressure; a pressure resistant cup; a cover for said cup, said cup and cover having interlocking lugs for attaching said cover to said cup and means for producing a pressure seal between cover and cup to provide a sealed pressure chamber, the cup and cover constituting a unit adapted to be shaken by hand; an inlet check valve on said cover for introducing gas under pressure into said chamber and retaining it therein, said valve having means for releasable attachment to a pressure hose coupling supplying carbon dioxide from said source; a manually operable relief valve on said cover for relieving pressure from said chamber; and means operable by the relative position of said cup and cover for establishing communication of the chamber with the atmosphere except when the lugs are in interlocked position, said unit being free from any rigid connection with said source for freedom of movement in all directions relatively to said source while under pressure.

6. A device for carbonating and dispensing beverages comprising in combination a source of carbon dioxide under pressure; a pressure resistant cup; a cover for said cup, said cup and cover having interlocking lugs for attaching said cover to said cup and means for producing a pressure seal between cover and cup to provide a sealed pressure chamber, the cup and cover constituting a unit adapted to be shaken by hand; an inlet check valve in the center of said cover for introducing gas under pressure into said chamber and retaining it therein, said valve having means for releasable attachment to a pressure hose coupling; a manually operable relief valve on said cover for relieving pressure from said chamber; means operable by the relative position of said cup and cover for establishing communication of the chamber with the atmosphere except when the lugs are in interlocked position; a base providing a seat for said cup to adjust said cup with respect to said base; a pressure hose coupling on said base adapted to be brought into engagement with said inlet check valve when said cup is seated on said base, said pressure hose coupling supplying carbon dioxide from said source; means for biasing said coupling out of engagement with said inlet valve; and manually operable means on said base for moving said coupling into engagement with said coupling against the action of said biasing means, said unit being free from any rigid connection with said source from freedom of movement in all directions relatively to said source while under pressure.

7. A device for carbonating and dispensing beverages comprising, a source of carbon dioxide under pressure; a pressure resistant cup having a rim and an outwardly extending protrusion adjacent to, and below, said rim; a cover having an inwardly extending protrusion for engaging, and locking with, the outwardly extending protrusion of the cup to form a sealed pressure chamber, the cup and cover constituting a unit adapted to be shaken by hand; a pressure supply hose attached to said cover and said source, respectively, said unit being non-rigidly connected with said source by said hose with freedom of movement in all directions relatively to said source while under pressure; an admission valve in said cover for admitting and shutting off supply of gas under pressure from said hose; and means in said cover for relieving pressure from said chamber.

8. A device for carbonating and dispensing beverages comprising, a source of carbon dioxide under pressure; a pressure resistant cup; a cover for said cup, said cup and cover having interlocking lugs for attaching said cover to said cup and means for producing a pressure seal between cover and cup to provide a sealed chamber, the cup and cover constituting a unit adapted to be shaken by hand; a pressure supply hose attached to said cover and said source, respectively, said unit being non-rigidly connected with said source by said hose with freedom of movement in all directions relatively to said source while under pressure; and a manually operable joint admission and pressure relief valve in said cover for admitting supply of gas under pressure from said hose, and for shutting off said supply and venting gas from said chamber, respectively.

9. A device for carbonating and dispensing beverages comprising a source of carbon dioxide under pressure; a pressure resistant cup; a cover for said cup, said cup and cover having interlocking lugs for attaching said cover to said cup and means for producing a pressure seal between cover and cup to provide a sealed pressure chamber, the cup and cover constituting a unit adapted to be shaken by hand; a pressure supply hose attached to said cover and said source, respectively, said unit being non-rigidly connected with said source by said hose with freedom of movement in all directions relatively to said source while under pressure; a manually operable joint admission and pressure relief valve in said cover for admitting supply of gas under pressure from said hose and for shutting off said supply and venting gas from said chamber, respectively, and means operable by the relative position of said cup and cover for establishing communication of said chamber with the atmosphere except when the lugs are in interlocked position.

PAUL KOLLSMAN.

REFERENCES CITED

The following references are of record in the file of this patent:

UNITED STATES PATENTS

| Number | Name | Date |
| --- | --- | --- |
| 2,051,933 | Andvig | Aug. 25, 1936 |
| 2,201,322 | Schwartz | May 21, 1940 |

FOREIGN PATENTS

| Number | Country | Date |
| --- | --- | --- |
| 3,106 | Great Britain | Feb. 21, 1889 |
| 19,522 | Great Britain | Nov. 11, 1891 |
| 28,980 | Great Britain | Dec. 16, 1912 |
| 233,743 | Great Britain | May 18, 1925 |
| 410,020 | Great Britain | May 10, 1934 |
| 483,958 | Great Britain | Apr. 28, 1938 |
| 9,797 | Germany | Sept. 5, 1879 |